USOO5673019A

United States Patent [19]
Dantoni

[11] Patent Number: 5,673,019
[45] Date of Patent: Sep. 30, 1997

[54] AUTOMATIC TURN SIGNAL AND SAFETY DEVICE

[76] Inventor: Joseph L. Dantoni, 3939 Roland Ave., Apt. 215, Baltimore, Md. 21211

[21] Appl. No.: 645,879

[22] Filed: May 14, 1996

[51] Int. Cl.$^6$ .................................................. B60Q 1/34
[52] U.S. Cl. ...................... 340/475; 340/478; 200/61.27; 200/61.3
[58] Field of Search ................................ 340/478, 476, 340/465, 475; 200/61.27, 61.3, 61.34, 61.35

[56] References Cited

U.S. PATENT DOCUMENTS

| | | | |
|---|---|---|---|
| 1,890,677 | 12/1932 | Friend | 340/465 |
| 1,950,278 | 3/1934 | Tsavaris | 340/475 |
| 2,114,731 | 4/1938 | Howard | 340/465 |
| 2,201,795 | 5/1940 | Schnurpfeil | 340/465 |
| 3,041,579 | 6/1962 | Kanzenbach | 340/478 |
| 3,852,543 | 12/1974 | Suzuki | 200/61.3 |
| 4,859,816 | 8/1989 | Tanaka | 200/61.3 |

*Primary Examiner*—Jeffrey Hofsass
*Assistant Examiner*—John Tweel, Jr.
*Attorney, Agent, or Firm*—Joseph J. Zito

[57] ABSTRACT

This invention has an Automatic Safety Turn Signal Adapter mounted on the steering shaft of a vehicle to control the flow of electricity. When the steering shaft is turned to the right or left the electric current from the vehicle battery is directed by the adapter to the electrodes that control the right or left side turn signals of the vehicle. The negative terminal of the battery is grounded to the vehicle frame. Power input flows from the battery positive pole, to the electrical apparatus of the adapter, to the turn signal lamps, to the negative grounded frame, and back to the battery negative pole, completing the electric circuit. As the current flows from the positive pole of the battery it passes through an electric circuit breaker which causes the turn signals to flash. The adapter has a switch to manually turn the turn signals off and on and a switch to manually turn the 4-way safety flashers off and on. The adapter controls the degree of turn, direction of turn and allows multiple turns of the steering wheel and shaft to meet the steering needs of modern vehicles.

17 Claims, 6 Drawing Sheets

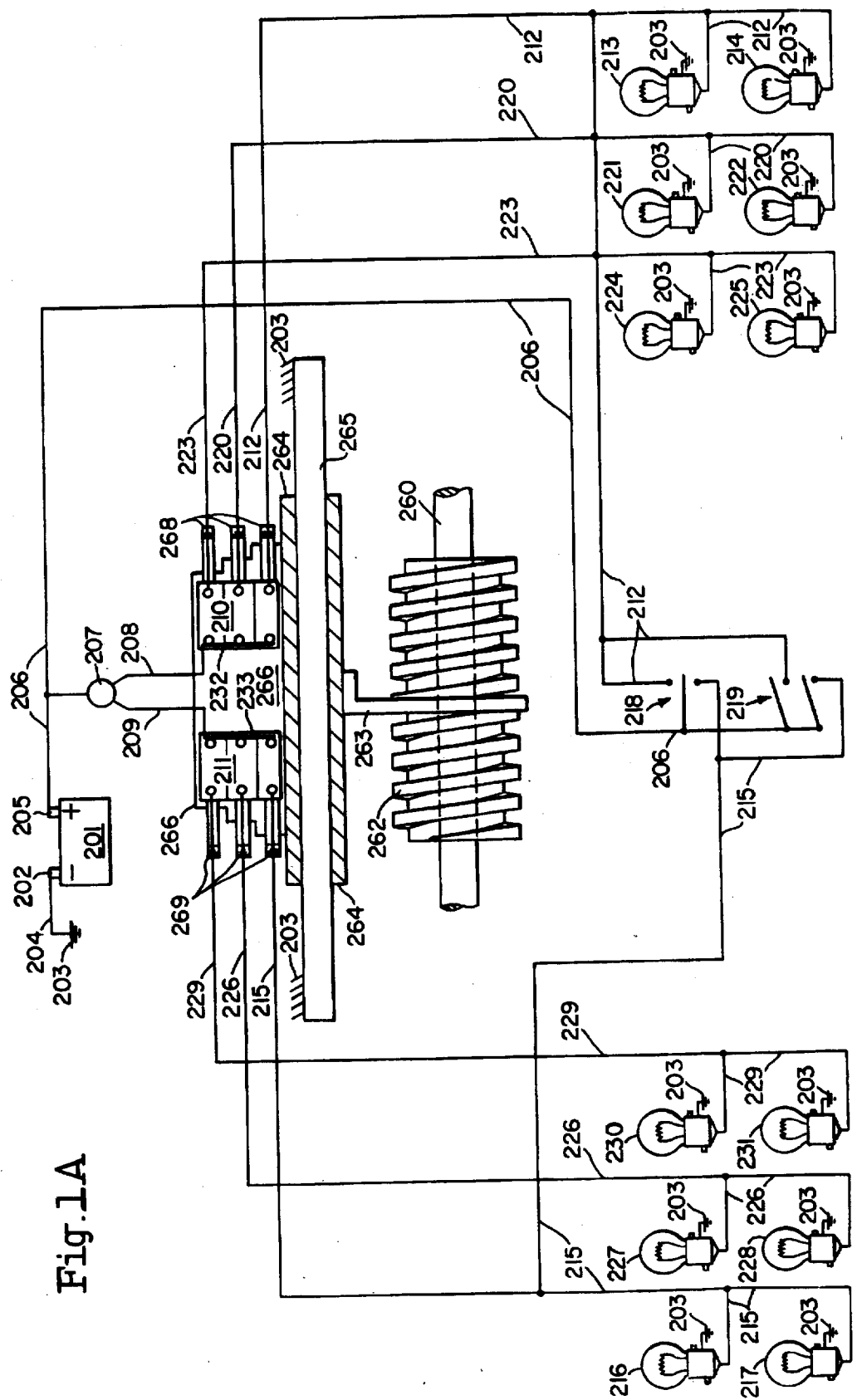

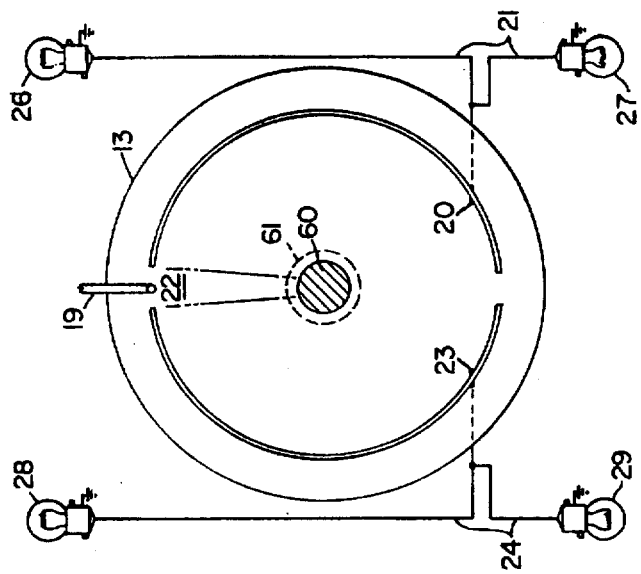
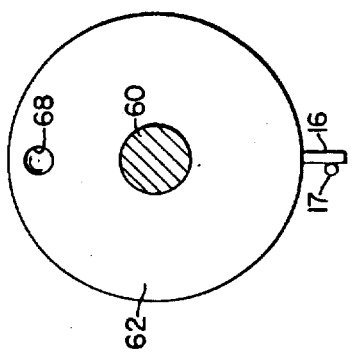
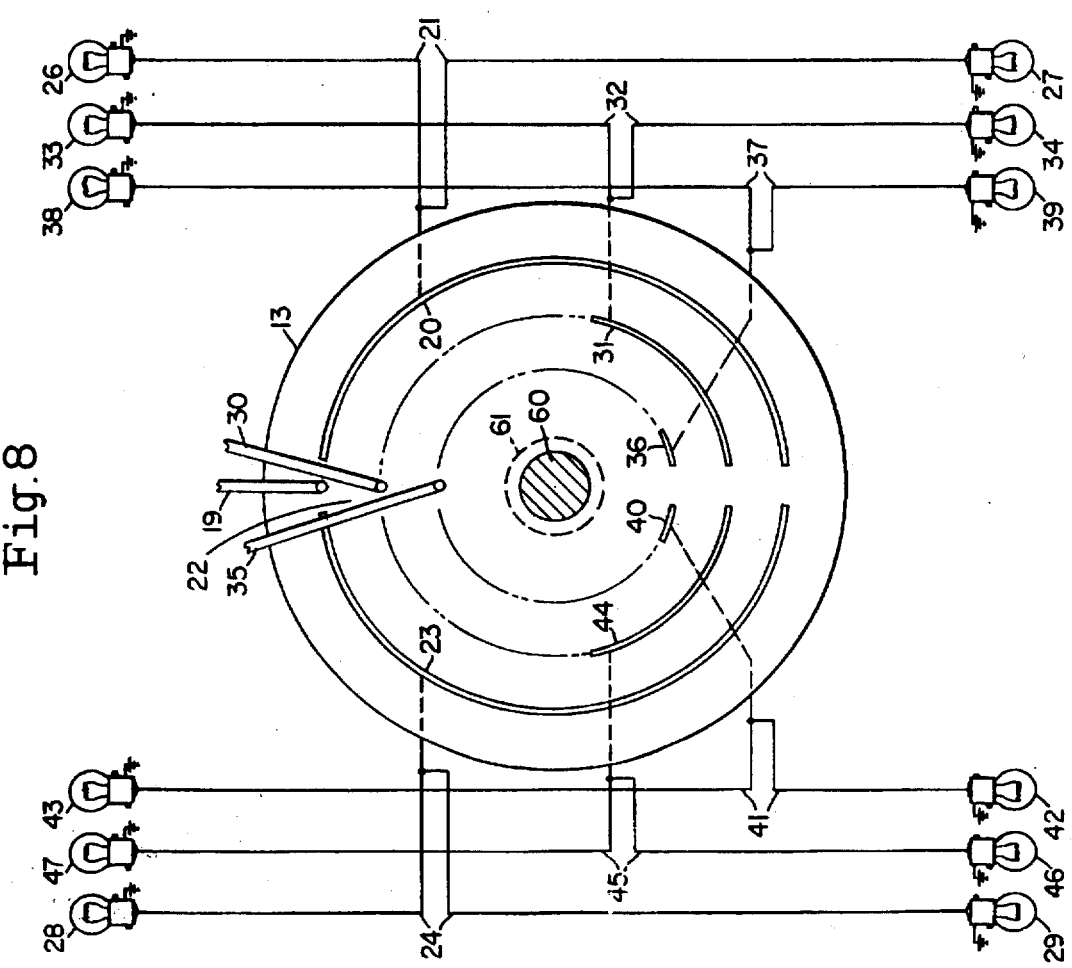

AUTOMATIC TURN SIGNAL AND SAFETY DEVICE

BACKGROUND OF THE INVENTION

1. Field of the Invention

This invention relates to vehicular turn signal devices. This invention is specifically concerned with a vehicle turn signal which automatically indicates the direction and degree of a turn as the turn is being made.

2. Description of the Prior Art

There are a number of prior art devices known to those of ordinary skill in the art for signaling the intention of a motor vehicle driver. However, most are not fully automatic and do not indicate both the degree and direction of the turn.

The earliest background art described signaling systems wherein an automatic switch was attached to the steering mechanism of the vehicle. The switch operated in accordance with the turning of the steering mechanism to energize a vehicle signal, whenever the vehicle turned away from a straight ahead course. All of these switches employed means for closing a left hand signaling circuit when the vehicle was turned away from a straight ahead course toward the left, and the left hand signal remained energized until the vehicle returned to the straight ahead course.

The switch comprised a disc, rotated by the steering mechanism, having a central common brush connected to the battery of the vehicle. Conductive segments were placed on the disc in such a position that no current passes through the switch when the vehicle is on a straight on course, but only when the vehicle is making a turn. These types of switches had the common drawback that they gave a false signal after the turn was made and while a reverse turn was being made to reach the straight-away course.

U.S. Pat. No. 2,175,848 resolved this problem with a means for automatically removing all indication whenever the angle of turn was decreased or reversed on the way back to a straight path. As a result a following vehicle is immediately notified that the left hand turn is finished and that the driver of the forward vehicle is returning to the straight away position.

The use of this Automatic Turn Signal and Safety Device overcomes the deficiencies in the prior art. As discussed above, prior art turn signals require the constant attention and action by the vehicle operator to manually move the turn signal lever up or down to activate the signal for a left or right turn.

One of the purposes of this invention is to activate automatic turn signal lights when the vehicle steering shaft, wheels and steering wheel are turned to the right or left.

A second safety feature of this invention is an automatic signal which can be used to indicate a turn by one or more sets of flashing lights in front and in the rear on the appropriate side of the vehicle to indicate the degree of right or left turn. The arrangement of flashing turn signal lights will prevent vehicle collisions.

A third safety feature of this invention is the use of a circuit breaker signal to flash turn signal lights.

A fourth safety feature of this invention involves turn signals which flash when leaving a parked position and entering a line of traffic, when an approaching a trash truck zig-zagging across the road to pick up trash on either side of the road as traffic approaches.

A fifth safety feature of this invention demonstrates the use of turn signal lights in the front and rear of the vehicle for indicating the degree of right or left turn.

A sixth safety feature of this invention is the multiple turn signal operation to indicate the degree of turn. When the steering wheel is turned and one light in front and rear on the same side flashes a slight turn is indicated. When the wheel is turned further, two lights in the front and rear on the same side false, a medium turn is indicated. As the steering wheel is turned further, three lights on the same side in the front and rear flash to indicate a sharp turn.

A seventh safety feature of the Automatic Turn Signal and Safety Device compensates for the design of the steering apparatus on vehicles which requires turning the steering wheel a number of complete turns in each direction to make a sharp right or left turn of the vehicle wheels. The design of this invention compensates for multiple turns of the vehicle steering wheel. It has the same capacity, if wheel turning is increased to 4, 5, 6 or more turns, to be useful for multiple turns.

An eighth feature of the Automatic Turn Signal and Safety Device allows miniaturization of the adapter to fit snugly on the steering column.

A ninth feature of the Automatic Turn Signal and Safety Device allows replacing the microswitch as a slide in device similar to the use if electric fuses used in vehicles.

SUMMARY OF THE INVENTION

The improved vehicular turn signal device converts the radial motion of the steering wheel into linear motion. The conversion means include a threaded steering column and a rider mechanism which rides the grooves of the steering column as the column is turned. A slidable beam is attached to the rider, adjacent to the threaded steering column. Mechanical actuators are mounted on the slidable beam and they in turn activate a plurality of microswitches. The microswitches are mounted adjacent to the mechanical actuators. As the rider and slidable beam move, the mechanical actuators incrementally actuate the microswitches. The microswitches in turn each activate a turn signal which reflects the direction and degree of the turn. The automatic vehicular turn signal provides a compact and efficient method of automatically indicating the degree and direction of a turn.

BRIEF DESCRIPTION OF THE DRAWINGS

FIG. 1A is a schematic diagram showing the entire configuration of the automatic vehicle turn signal and safety device according to the preferred embodiment of the invention, which utilizes a series of microswitches to activate a plurality of signal lights.

FIG. 8 is an elevational view of the disk electrode plate with electrical contacts capable of actuating a series of three signal lights as disclosed in the second alternative embodiment.

FIG. 9 is an elevational view of the disk electrode plate with electrical contacts capable of actuating a single signal light as disclosed in the third alternative embodiment.

FIG. 10 is an elevational view of the conductor plate with void for the detente stop ball as disclosed in the second and third preferred embodiments.

DETAILED DESCRIPTION OF THE INVENTION

An embodiment of the invention will be described in detail below with reference to the drawings.

Referring first to FIG. 1A, there is shown a schematic of the entire arrangement of the automatic vehicular turn signal apparatus according to the preferred embodiment of the invention.

Figure 1C:
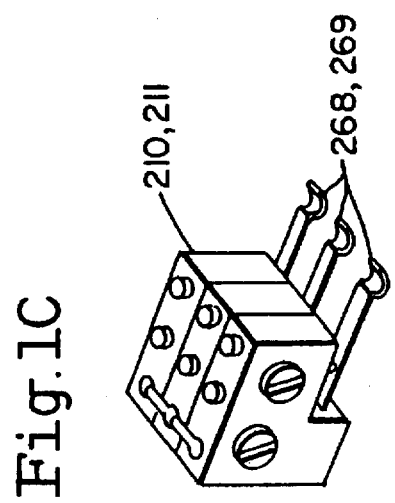
FIG. 1C is a perspective view of the removable microswitch device as utilized in the primary embodiment of the invention.
Figure 1B:
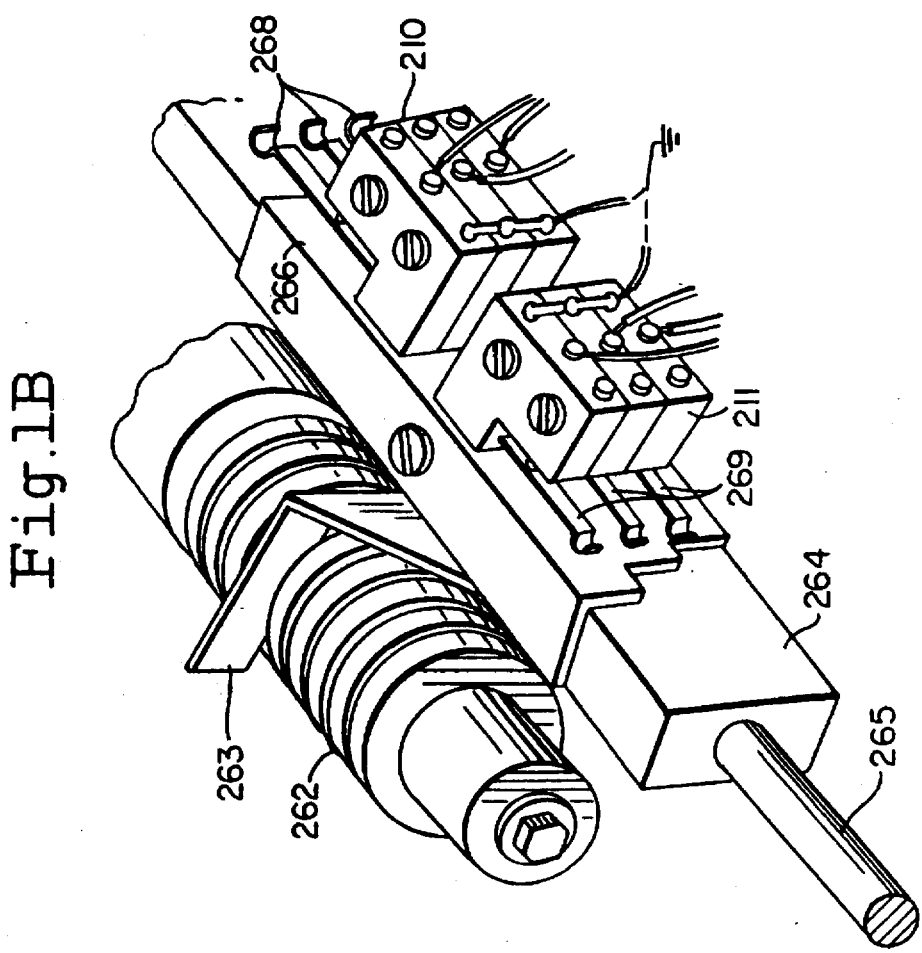
FIG. 1B is a perspective view of the grooved steering column and plurality of microswitches as disclosed in the primary embodiment of the invention.
Figure 5:
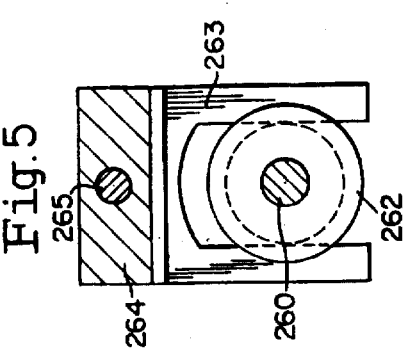
FIG. 5 is an elevational view of the rider mechanism and grooved steering column system as utilized in the first and second embodiments of the invention.
Figure 6:
FIG. 6 is a perspective view of the mechanical actuator with three levels of gradation, as utilized by the first preferred embodiment of the invention.
Figure 7:
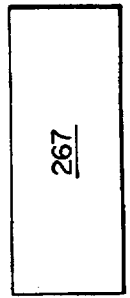
FIG. 7 is a perspective view of the mechanical actuator, with a single gradation, as utilized by the second preferred embodiment.

The preferred embodiment of the invention uses a non-conducting plastic tube with spiral grooves cut into its exterior side 262 (FIG. 1A and 1B). The tube is firmly attached to the vehicle steering column 260 and turns as the column is turned. A stirrup fork 263 rides the grooves, FIG. 1B, and as the spiral tube rotates, the stirrup rider 263 moves from one end of the tube to the other end to activate the right or left turn signal.

Referring again to FIG. 1A, when making a right turn, the steering column is turned to the right, the plastic tube adapter turns right, the rider mechanism 263 moves to the right, moving slider 264 to the right. Plate switch 266 is moved to the right and lifts the microswitch 268. The circuit is now closed from microswitch 268 to wire 212. As plate switch 266 moves further to the right it lifts microswitch 268 to wire 220. The circuit is now closed from microswitch 268 to wire 220. As plate switch 266 continues to move further to the right it lifts microswitch 268 to wire 223. The circuit is now closed from microswitch 268 to wire 223.

Electrical power is supplied by a battery 201. The negative post of the battery 202 is grounded by wire 204 to the vehicle metal frame 203. The entire vehicle metal frame has a negative ground.

Current from the positive pole 205 of the battery 201 flows via wire 206 to current flasher 207, and then via wire 208 to the multiple connector for microswitch 210. Current flows from the microswitch to wire 212 when the microswitch is raised. Positive current flows in wire 212 to right turn signals 213 and 214. The circuit is complete and the turn signals are grounded to the negative frame 203. The turn signals flash indicating a slight turn.

As the plate switch 266 is moved further to the right, microswitch to wire 220 is raised, current flows via wire 220 to the turn signals 221 and 222. Right turn signals 213, 214, 221 and 222 all flash indicating a medium turn.

As plate switch 266 moves further to the right, microswitch to wire 223 is raised, current flows via wire 223 to turn signals 224 and 225. Right turn signals 213, 214, 221, 222, 224, and 225 all flash indicating a sharp right turn.

For a left turn, current flows from the flasher 207 via wire 209 to multiple microswitch contacts of microswitch 211. For a left turn, steering column 260 turns to the left, plastic tube 262 turns to the left causing plate switch 266 to move to the left. Plate switch 266 raises microswitch 211 to wire 215, it moves further to raise the microswitch to wire 226 and further raise the microswitch to wire 229.

Electric current flows from flasher 207 to wire 209 to multiple connections of the microswitch. After plate switch 266 raises the microswitch to wire 215, current flows via wire 215 to left turn signal 216 and 217. Both flash indicating a slight turn.

As plate switch 266 moves further to the left it raises microswitch to wire 226. Current flows via wire 226 to left turn signals 227 and 228. Left turn signals 227, 228, 216 and 217 all flash indicating a medium turn.

As the steering column continues to turn, plate switch 266 moves further to the left and raises the microswitch to wire 229. Current flows via wire 229 to left turn signals 230 and 231. Left turn signals 216, 217, 227, 228, 230 and 231 all flash indicating a sharp left turn.

At this point all three signal lights have been activated indicating a sharp turn. Commuters following the vehicle will be warned of sharp evasive maneuvers.

The preferred embodiment of this invention also includes a manual turn signal 218 and a four-way emergency flasher. FIG. 1 illustrates the manual turn signal 218. The manual signal 218 utilizes a single throw double pole switch. Wire 215 has a short electrode wire with an electrode at its end. Wire 212 has a short electrode with electrode at its end. Wire 206 from the positive side of the battery is the single pole. When the switch is manually pushed up, the pole 206 connects to the wire 212. Lights 213 and 214 flash for a right turn. Pushing the switch down flashes lights 216 and 217 indicating a left turn.

The four-way emergency lights 219 have a double pole double throw switch. Wire 206 from the battery is connected to the double poles. Wire electrode 212 and 215 are the double poles. When the double poles 206 connect to the switches 212 and 215, the switch is complete and lights 213, 214, 216 and 217 flash.

Figure 2:
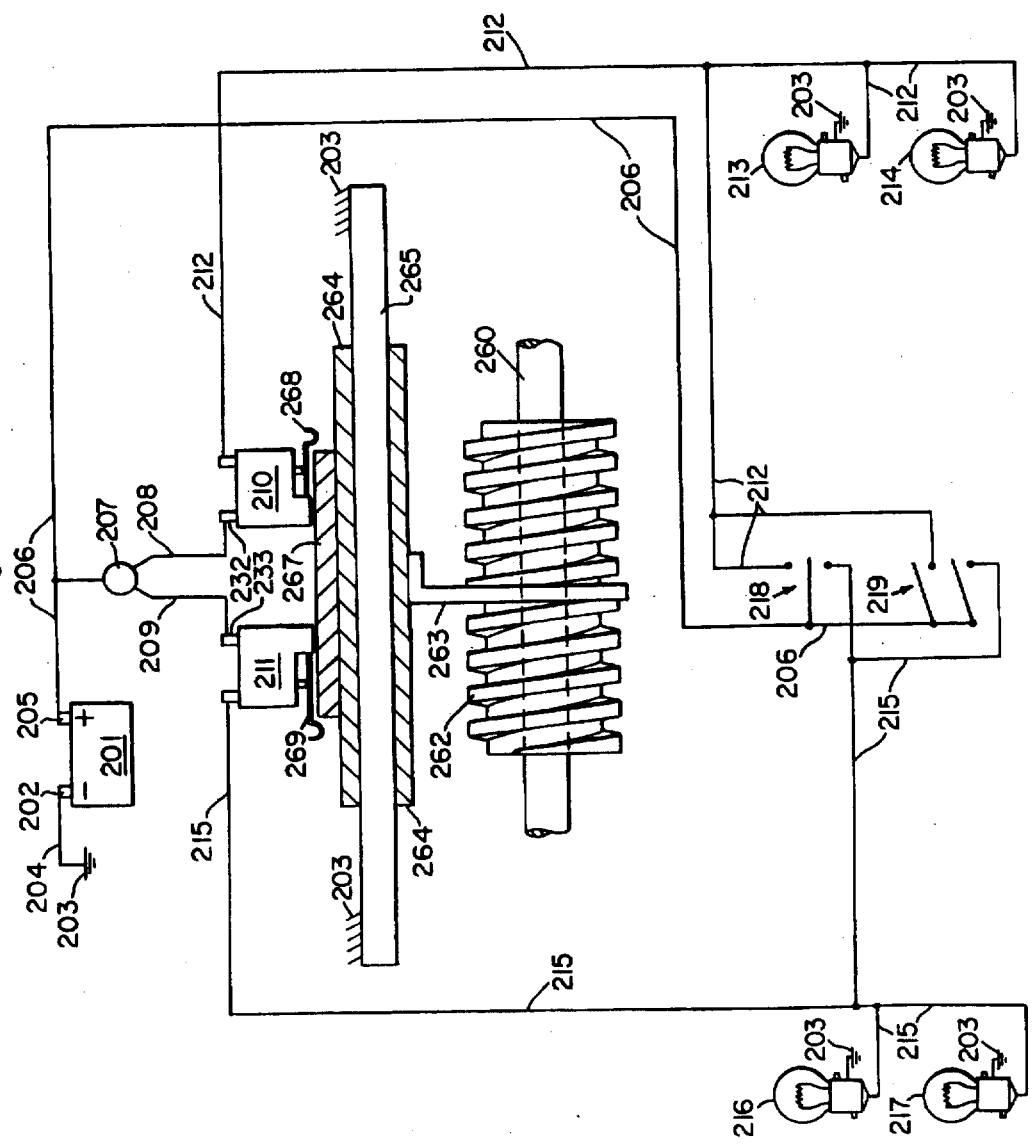
FIG. 2 is a schematic diagram of the entire configuration of the automatic vehicle turn signal and safety device according to the first alternative embodiment of the invention, which utilizes a single microswitch to activate a single signal light.

FIG. 2 is a schematic view of the first alternative embodiment. The first alternative embodiment of the invention is nearly identical to the preferred embodiment. Both include a manual signal and four-way flasher feature. However, the first alternative embodiment does not activate a series of turn signal lights, but instead employs only a single light automatically indicating the direction of the turn.

FIG. 2 illustrates the invention with a single turn signal light in the front and rear of both sides of the vehicle. As the steering column 260 turns for a right turn, the rider mechanism 263 moves to the right. When the steering column moves to the left, the rider mechanism moves to the left.

Slider 264 rides on the slider guide 265. It is firmly attached to the rider and moves to the right or left as the stirrup moves. As the switch moves to the right, it raises switch 268 of microswitch 267. When it moves to the left it raises switch 269. When switch 268 or 269 is raised the electric circuit in the microswitch is complete and current flows through microswitches 210 and 211 to wires 212 or 215.

For a right turn, current flows from the positive wire 208 to wire 212 through microswitch 210. For a left turn, current flows from positive wire 209 through microswitch 211 to wire 215.

Electrical power for this invention is provided by a battery 201. The negative post of the battery 202 is grounded by wire 204 to the vehicle metal frame 203. The entire vehicle metal frame 203 has a negative ground.

Current from the positive pole 205 of the battery 201 flows via wire 206 to electric current flasher 207. From the flasher 207, wire 208 is a common connector for the right turn side of the vehicle microswitch 210. Wire 209 is a common connector for the left turn side of the vehicle microswitch 211. Firmly fixed to the slider 264 is a plate switch 267. The steering column 260 turns for a right turn, plastic tube adapter 262 turns for the right turn, stirrup 263 moves to the right, slider 264 on slider glide 265 moves to the right, plate 267 moves to the right and lifts electrode 268. Electric current flows through microswitch 210 from positive wire 208 to wire 212 to turn signals 213 and 214. Signal 213 and 214 are grounded to a negative frame 203 and they flash.

As the steering column 260 turns for a left turn, plastic adapter 262 turns to the left, rider 263 moves to the left, slider 264 on slider glide 265 moves to the left, plate 267 moves to the left and lifts electrode 269. Electric current flows through microswitch 211 from positive wire 209 to wire 215 to left turn signals 216 and 217. Signals 216 and 217 are grounded to the negative frame and they flash. For the right turn signal and left turn signal the current is complete from the positive pole 205 to the negative pole 204.

FIG. 1C is a perspective view of the microswitch device as it is attached to the vehicle steering column. The device is compact and removable, much like a fuse.

Figure 3:
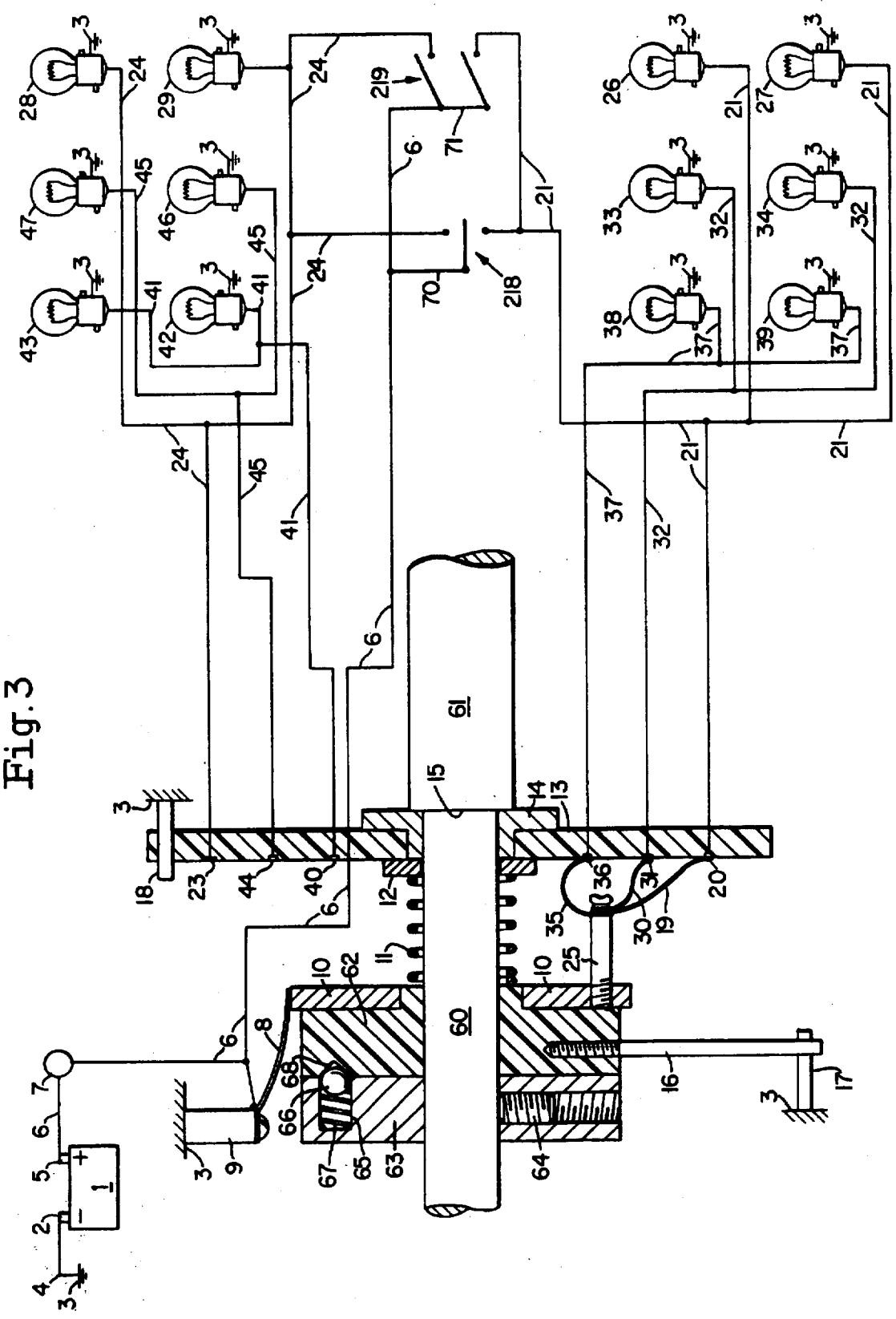
FIG. 3 is a schematic diagram of the entire configuration of the automatic vehicle turn signal and safety device according to the second alternative embodiment of the invention, which utilizes a disk electrode plate to activate a plurality of signal lights.

FIG. 3 illustrates the second alternative embodiment of the invention. This embodiment, like the preferred embodiment, offers a manual turn signal, four-way flasher lights and a series of turn signals that automatically indicate the direction and degree of the turn.

With this embodiment of the invention, front and rear triple left turn lights and front and rear triple right turn signals add a safety feature to the use of the automatic turn signal lights. Slight, medium and sharp turns are demonstrated by using the triple lights.

FIG. 8 illustrates that as the vehicle is proceeding straight down the street with the wheels pointed straight ahead, the wiper electrodes 19, 30 and 35 are in the neutral area 22 of the disc 13. Returning to FIG. 3, when the wheels are turned slightly to the right, the wiper electrode 19 contacts the disc electrode 20. Positive current flows from electrode 20 to wire 21 to turn signals 26 and 27. Turn signals 26 and 27 are grounded to the negative frame and flash. This indicates a slight turn.

As the steering column turns further, wiper electrode 30 contacts disc electrode 31. Current flows from electrode 31 to wire 32 and further to signals 33 and 34. Both lights 33 and 34 have a negative ground to the frame 3. The circuit is complete and lights 33, 34 26 and 27 flash. A medium turn is indicated.

As the steering column 60 and 61 continues turning, wiper electrode wire 35 contacts disc electrode 36 and positive current flows from electrode 36 to wire 37 and turn signals 38 and 39. Both turn signals are negatively grounded and the circuit is complete and lights flash. Turn signals 38, 39, 33, 34, 26 and 27 flash. A sharp right turn is indicated by the lights.

To make a left turn, wiper electrode 19 contacts disc electrode 23 and positive current flows by wire 24 and to signals 28 and 29. Lights are grounded to the negative frame 3. The circuit is complete and left turn lights 28 and 29 flash indicating a slight left turn.

As the steering column turns further, wiper electrode 30 contacts disc electrode 44. Positive current flows from electrode 44 to wire 45 and lights 46 and 47, which are grounded to frame 3. The circuit is complete and lights 46, 47, 28 and 29 flash indicating a medium turn.

As the steering column continues to turn, the wiper electrode 35 makes contact with the disc electrode 40. Positive current flows via wire 41 to lights 42 and 43. The circuit lights 42 and 43 are grounded to frame 3. The circuit is completed and lights 43, 44, 46, 47 and 28 and 29 flash indicating a sharp turn.

The second embodiment also features a manual turn signal function as well as four-way hazard lights.

The manual turn signal requires a negative short wire electrode from wire 24 and a negative short wire electrode from wire 21. A single pole double throw switch with the positive pole 70 connected to the positive 6 is used to direct current. When the pole 70 is pressed right, the right turn signals 26 and 27 are flashed. If the pole 70 is pushed to the left, the left turn signals 28 and 29 are flashed.

The four-way flasher requires a short wire electrode from wire 24 and a short wire electrode from wire 21. A positive current flows in the double pole 71. When double pole 71 contacts electrodes 24 and 21 via switch 219, lights 28, 29, 27 and 27 flash. They are negatively grounded.

The double throw single pole switches 71 are connected to positive wire 6. When the switch is closed, left turn lights 28 and 29 and right turn lights 26 and 27 flash. All four lights are connected to the negative grounded vehicle frame 3. The circuit is complete and all four emergency lights flash.

Figure 4:
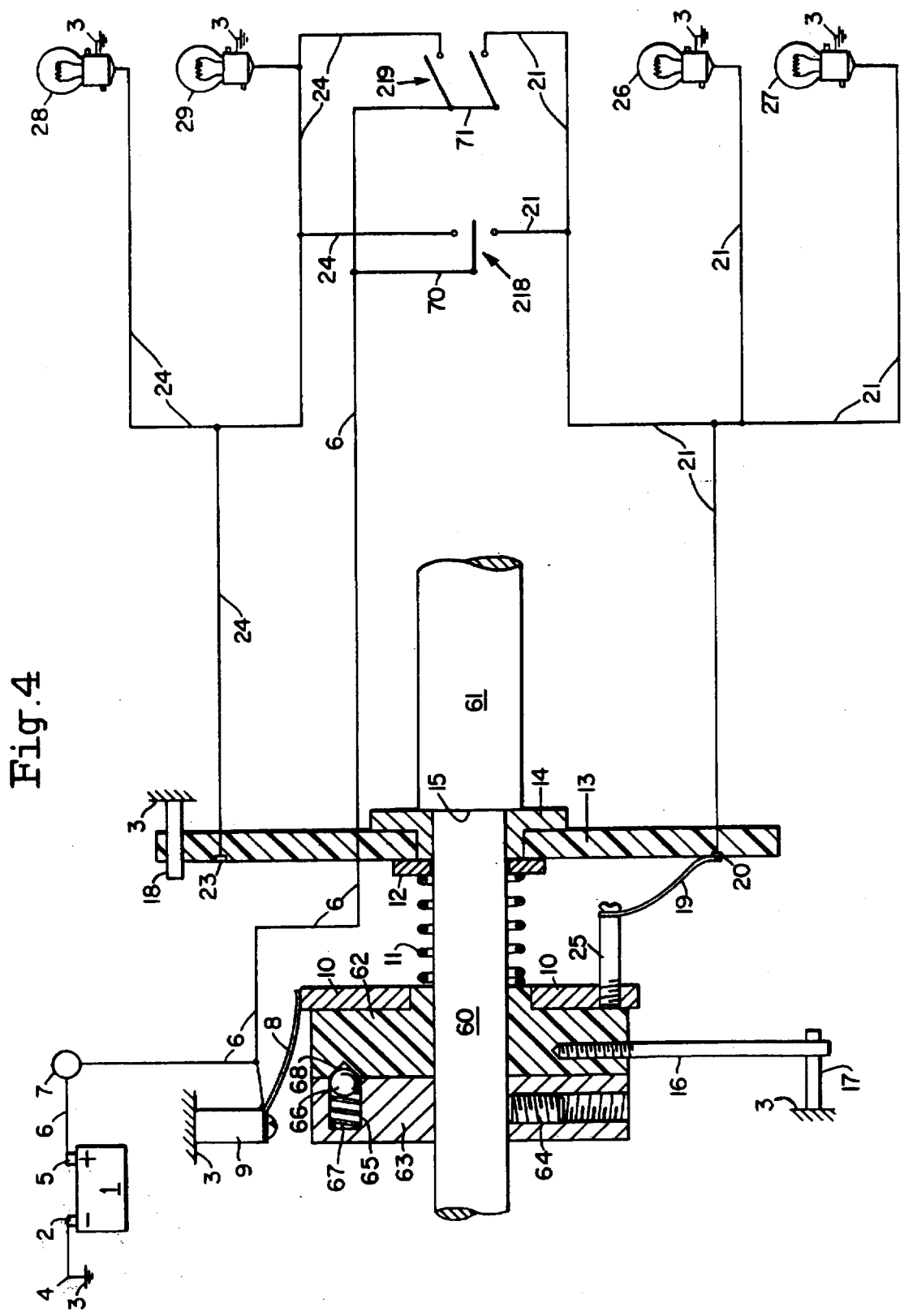
FIG. 4 is a schematic diagram of the entire configuration of the automatic vehicle turn signal and safety device according to the third alternative embodiment of the invention, which utilizes disk electrode plate to activate a single signal light.

FIG. 4 is a schematic of the third alternative embodiment of the invention. Like the second alternative embodiment, this embodiment offers a manual turn signal and four-way flasher lights. However, this embodiment only offers a single light which is automatically actuated by the turning of the steering column.

In FIG. 4, the source of power for the adapter flows from the battery 1. The negative pole 2 of the battery is grounded to the vehicle frame 3 via wire 4. The entire metal vehicle frame 3 has a negative ground. Power input from the positive battery pole 5 flows through a wire 6 to the circuit flasher 7. Current continues to flow via wire 6 to the electrode wiper 8. Electrode wiper 8 is held in place by a hold fast 9 attached to the vehicle frame 3. The electrode wiper 8 wipes the conductor 10 and current flows to the conductor pole 25 and to the electrode wiper 19

FIG. 4 also provides a detailed diagram of the steering column. The steering column 60 has a steering collar 63, insulator 62 with rotating pole 16 and stop 17, conductor 10, spring 11, washer 12, disc electrode 13, a second washer 14 and an enlarged steering column 61 at 15. The steering collar 63 has a set screw 64 that holds the insulator 62, conductor 10, spring 11, washer 12, disc electrode 13, and second washer 14 against the enlarged steering column 61. The spring 11 is condensed so that it provides pressure against the steering collar 63 and enlarged steering column 61 in order to hold the insulator 62, conductor 10, spring 11, washer 12, disc 13 with the hold fast 18 connecting it to the frame 3 and washer 14 tightly together on the steering column 61.

FIG. 9 is an elevational view of the disc electrode plate 13. The disc electrode 13 remains stationary as the enlarged steering column is turned. The disc electrode plate 13 has a neutral region 22 between the disc electrodes 20 and 23. When the vehicle wheels are straight ahead, the wiper electrode 19 is in the neutral area 22.

Referring again to FIG. 4, as the steering column 60 and 61 turns right, current flows from electrode 20 to wire 21 to the turn signal lights 26 and 27. Turn signal lights 26 and 27 are grounded to the negative frame 3. The circuit is complete and turn signals 26 and 27 flash.

For a left turn, steering column 60 and 61 turns left and the positive current wiper 19 contacts the left disc electrode 23. Current flows from wiper electrode 19 to disc electrode 23 to wire 24 to turn signals 28 and 29. Turn signals 28 and 29 are grounded to the frame, the circuit is complete and the signals flash. Both wire 21 and wire 24 extend from electrodes 20 and 23 through plastic disc adapter 13. As wiper electrode 19 turns one-half a revolution it is stopped by stop 17. Steering column 60 and 61 is in the center of the disc adapter and turn. Disc adapter 13 does not turn.

The design of the steering collar 63 with a drop in ball 66, detente 65, and spring 67 meets the needs of newly designed vehicles when the steering wheels and column turn a number of times to make the turn easier. The detent 65 has a spring 67 to position the drop in ball 66. The steering collar 63 turns as the steering column 60 is turned.

FIG. 10 is an elevational view of the insulator with a void for the detente drop ball. The insulator 62 has a small hole 68. Referring back to FIG. 4, hole 68 catches the detent ball 66 and in turn rotates the insulator 62 and the conductor 10. The spring 67 assists positioning the detent 65 position to ensure that it catches in the insulator hole 68. As the steering collar 63 with the ball 66, detent 65 and spring 67 turn, the ball 66 catches in the hole 68 in the insulator 62 and rotates the insulator 62 and the conductor 10.

Disc adapter 13 is a non-conducting plastic with a right turn electrode 20 and a left turn electrode 23. Steering column 60 and 61 extends through the center of the disc. The disc 13 does not turn as the steering column 60 and 61 turns. It is held by a hold fast 18 attached to the frame 3. Right turn electrode 20 is connected to wire 21 and left turn electrode 23 is connected to wire 24. Both wires 21 and 24 extend through the plastic disc 13. Wire 21 is connected to right turn signal 28 and 29. They are grounded, the circuit is complete and they flash. Wire 24 is connected to left turn signals 28 and 29. They are grounded, the circuit is complete and they flash.

The wiper electrode rubs the conductor 10 as it is turned by the ball 66 and the spring 67 in the detent 65. Electric current flows through electrode 10 to electrode pole 25 to wiper electrode 19.

As steering collar 63, ball 66, detent 65 and spring 67 turn, the ball 66 catches in a hole 68 and rotates the insulator 62 and the conductor 10. After one-half a revolution the insulator pole 16 hits the rotation stop 17 preventing the insulation 62 and conductor 10 from turning further. The conductor 10 has stopped rotating but still conducts electricity. The electrode wiper 8 stays in contact with the conductor 10, current flows from electrode wiper 8, to conductor 10, to conductor pole 25, and then to wipe electrode 19. The insulator 62 and conductor 10 have stopped rotating but the conductor 10 continues to conduct electricity and the steering collar 63 will continue to turn with the ball between the insulator 62 and the steering collar 63 to prevent damaging the ball 66. The steering collar 63 continues turning until steering column is reversed. The steering column collar 63 insulator 62 conductor pipe 25 and wiper electrode 19 reverse their direction of turn. As rotation occurs the ball is between the insulator 62 and the steering column collar 63. The ball slips into the hole 68 in the insulator 62 and returns the steering collar 63, insulator 62, conductor 10, conductor post 25 and wipe 19 to a neutral position 22 of FIG. 9. The wheels of the vehicle are now straight ahead.

To indicate a right turn wiper electrode 19 contacts disc electrode 20 and current flows via wire 21 to grounded right turn signals 26 and 27. Turn signal lights 26 and 27 are grounded to the negative vehicle frame 3. The circuit is complete and turn signal lights 26 and 27 flash.

To make a left turn, wiper electrode 19 turns left and contacts disc electrode 23 and current flows via wire 24 to turn signal lights 28 and 29. Turn signal lights 28 and 29 are grounded to the negative frame 3. The circuit is complete and the turn signals 28 and 29 flash.

I claim:

1. An automatic vehicle turn signal and safety device for a vehicle having a rotatable steering mechanism, comprising:

sensors for automatically detecting the degree of turn of said steering mechanism, wherein said sensors detect the degree of rotation of the initial revolution in either direction from a neutral position and permit additional revolutions while maintaining said initial revolution detection, a plurality of safety indication light components, including a first set of lights for indication of shallow turns and a second set of lights for indication of sharp turns, and a control operatively connected to said sensors and said safety indication components for actuating said plurality of safety indication components in proportion to the degree of turn by actuation of said first set of lights upon detection of a shallow turn and said second set of lights upon detection of a sharp turn.

2. The automatic vehicle turn signal and safety device recited in claim 1 further comprising:

means for converting the turning motion of said steering mechanism into linear motion wherein said control means for actuating said plurality of safety indication components is responsive to said linear motion.

3. The device recited in claim 2 wherein said means for converting turning motion of said steering mechanism into linear motion includes:

a threaded steering shaft, a rider mechanism operatively engaged by said threaded steering shaft, without limiting the rotational movement of said shaft, and a slidable beam connected to said rider and positioned adjacent to said threaded steering shaft, wherein said beam is moved linearly with respect to said threaded steering shaft through said operative engagement of said rider upon rotation of said steering mechanism.

4. The device recited in claim 3 wherein said control means includes:

mechanical actuators mounted on said slidable beam, and a plurality of microswitches mounted in a fixed relation to said steering column and divided into a left set and a right set of switches, the switches of each set being sequentially activated by said mechanical actuators upon said linear movement of said slidable beam, wherein, a first one set of micro switches is fully actuated during a single rotation of said shaft and said beam continues to be moved by additional rotation of said shaft without any change in the actuation of said one set of microswitches.

5. The device recited in claim 4 wherein said control means includes:
said plurality of microswitches mounted on said slidable beam, and
said mechanical actuators mounted in a fixed relation to said steering column sequentially activated upon said linear movement of said slidable beam.

6. The device recited in claim 4 wherein said mechanical actuators actuate said plurality of safety indication components.

7. The device recited in claim 1 wherein said plurality of safety indication components includes:
three distinct levels of mechanical actuators,
three microswitches which are individually activated by said three distinct levels of mechanical actuators, and
three signal lamps which are individually activated by said three microswitches.

8. The device recited in claim 7 wherein said signal lamps are sequentially activated indicating the direction and degree of turn in a manner intuitive to observers.

9. The device recited in claim 1 wherein said sensing means includes:
an enlarged steering shaft,
a plurality of electrode wipers, operatively engaged by said enlarged steering column, and
a disc electrode plate with a plurality of concentric electrical contacts capable of contacting said electrode wipers, sequentially for right or left turn indicating the direction and degree of turn.

10. The device recited in claim 1, wherein said control means includes:
a steering shaft collar having a plurality of concentric contact rings and a void positioned on the radial edge of said steering shaft collar,
left and right indicator actuator contacts positioned to contact selected ones of said concentric contacts rings as said steering shaft is rotated,
a detent ball which catches said void when said steering column has completed a one half revolution turn, and
an insulator pole attached to said steering shaft collar which contacts a rotation stop when said steering column has completed a complete turn.

11. The device recited in claim 5 wherein said control comprises an easily removable and replaceable compact unit.

12. The device of claim 3, wherein said threaded shaft is of sufficient length to allow for multiple turns of the shaft to meet the needs of late model vehicles, without driving said rider to the limits of its travel.

13. The device of claim 10, further comprising a compression spring operative to maintain said void and said detent ball in operative engagement while allowing for multiple turns of said steering shaft.

14. The device of claim 13, wherein said insulator pole engages said stop, said detent ball rides within said void preventing rotation of said wipers after one half revolution of said shaft, while said shaft continues to rotate through multiple successive rotations.

15. The device of claim 1, further comprising manual actuating means for selectively activating one or more of said safety indication lights.

16. The device of claim 15, wherein said manual actuating means includes:
a lever actuatable in a first direction to activate a first set of safety indication lights and actuatable in a second direction to activate a second set of said safety indication lights and
a switch for simultaneous intermittent actuation of all of said safety indication lights.

17. The device of claim 1, wherein said plurality of safety indication light components further includes a third set of lights for indication of a moderate turn.

* * * * *